United States Patent [19]

Hertzberg

[11] Patent Number: 4,786,343
[45] Date of Patent: Nov. 22, 1988

[54] METHOD OF MAKING DELAMINATION RESISTANT COMPOSITES

[75] Inventor: Paul E. Hertzberg, San Diego, Calif.

[73] Assignee: The Boeing Company, Seattle, Wash.

[21] Appl. No.: 732,753

[22] Filed: May 10, 1985

[51] Int. Cl.$^4$ .................... B32B 31/16; B32B 7/08
[52] U.S. Cl. .................... 156/93; 112/262.1;
    112/423; 156/92; 244/123; 244/131; 244/133;
    428/102; 428/408
[58] Field of Search ............ 29/526 A, 526 R;
    112/262.1, 423, 440; 156/91, 92, 93, 330;
    244/119, 123, 126, 129.1, 131, 132, 133;
    428/102, 120, 408, 902

[56] References Cited

U.S. PATENT DOCUMENTS

| | | | |
|---|---|---|---|
| 3,719,545 | 3/1973 | Lawler. | |
| 3,841,954 | 10/1974 | Lawler. | |
| 3,996,084 | 12/1976 | Holmes | 156/93 |
| 4,063,684 | 12/1977 | O'Brien et al. | 239/265 |
| 4,206,895 | 6/1980 | Olez | 244/123 |
| 4,218,276 | 8/1980 | King | 156/92 |
| 4,256,790 | 3/1981 | Lackman et al. | 428/73 |
| 4,299,871 | 11/1981 | Forsch | 428/104 |
| 4,331,495 | 5/1982 | Lackman et al. | 156/93 |
| 4,331,723 | 5/1982 | Hamm | 428/61 |
| 4,368,086 | 1/1983 | Villemain | 156/93 |
| 4,445,951 | 5/1984 | Lind et al. | 156/93 |

Primary Examiner—Robert A. Dawson
Attorney, Agent, or Firm—Christensen, O'Connor, Johnson & Kindness

[57] ABSTRACT

Fiber reinforced resin composites formed by elements joined by a high shear strength, high fracture toughness adhesive are disclosed. The elements are created in easily produceable cross-sectional shapes such as flat, C-shaped, Z-shaped or T-shaped. When joined, the elements form delamination resistant fiber reinforced resin composites having more complex shapes. The strength of the junctions between a pair of elements, such as a panel and its associated reinforcing members, can be enhanced by fasteners, such as rivets, if desired.

30 Claims, 5 Drawing Sheets

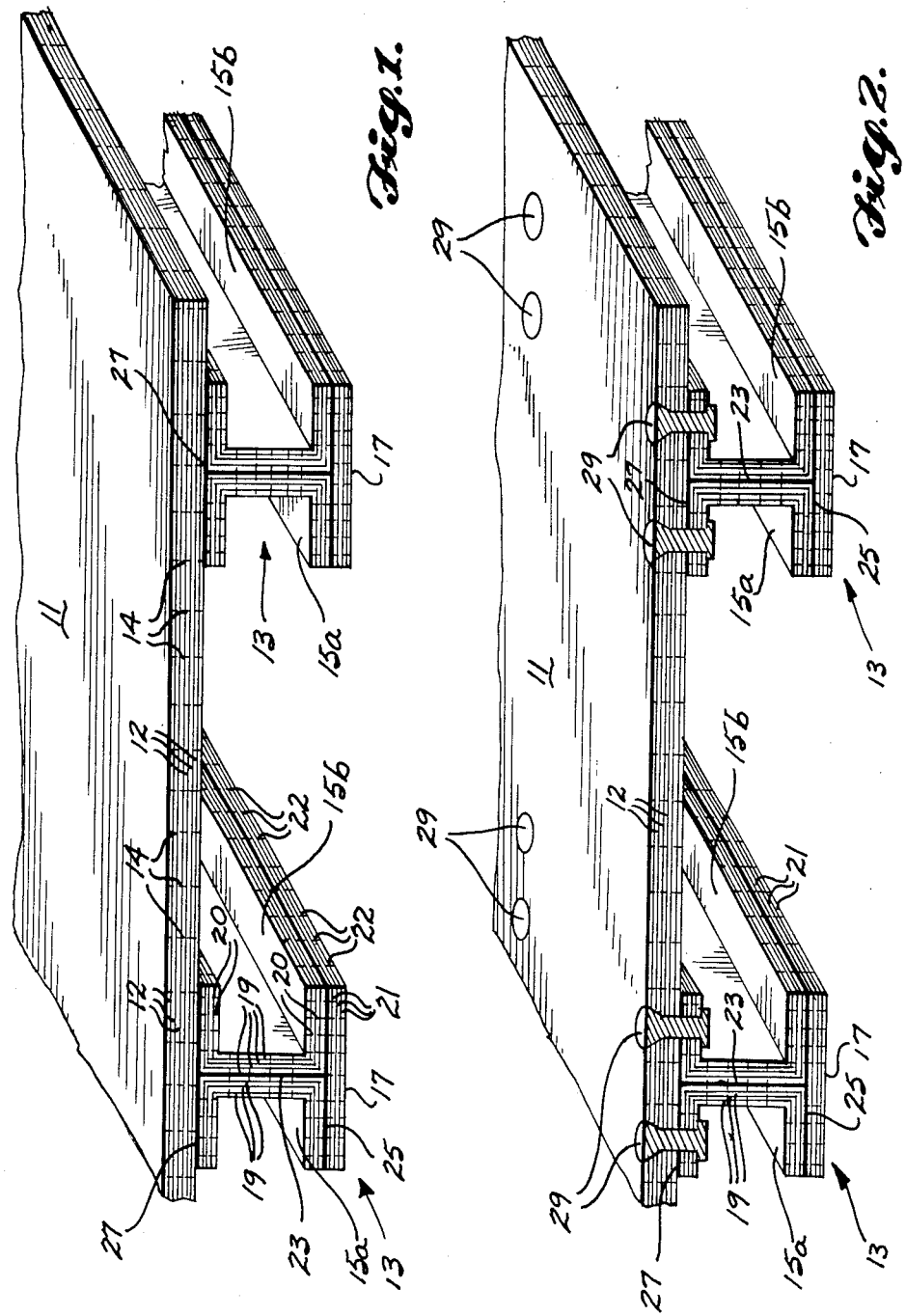

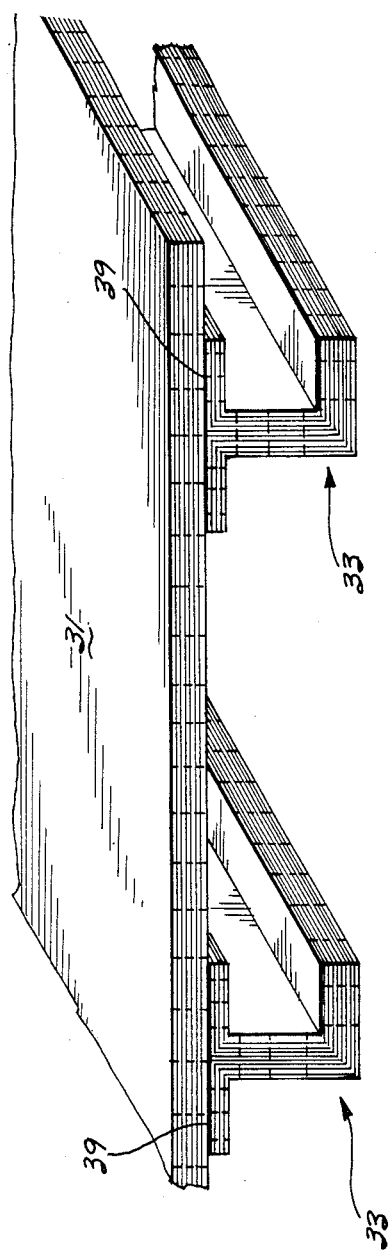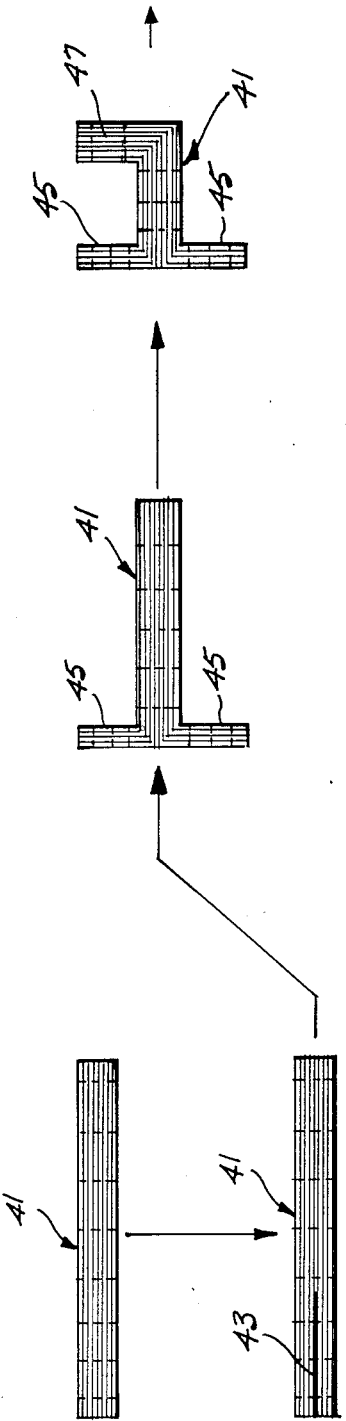

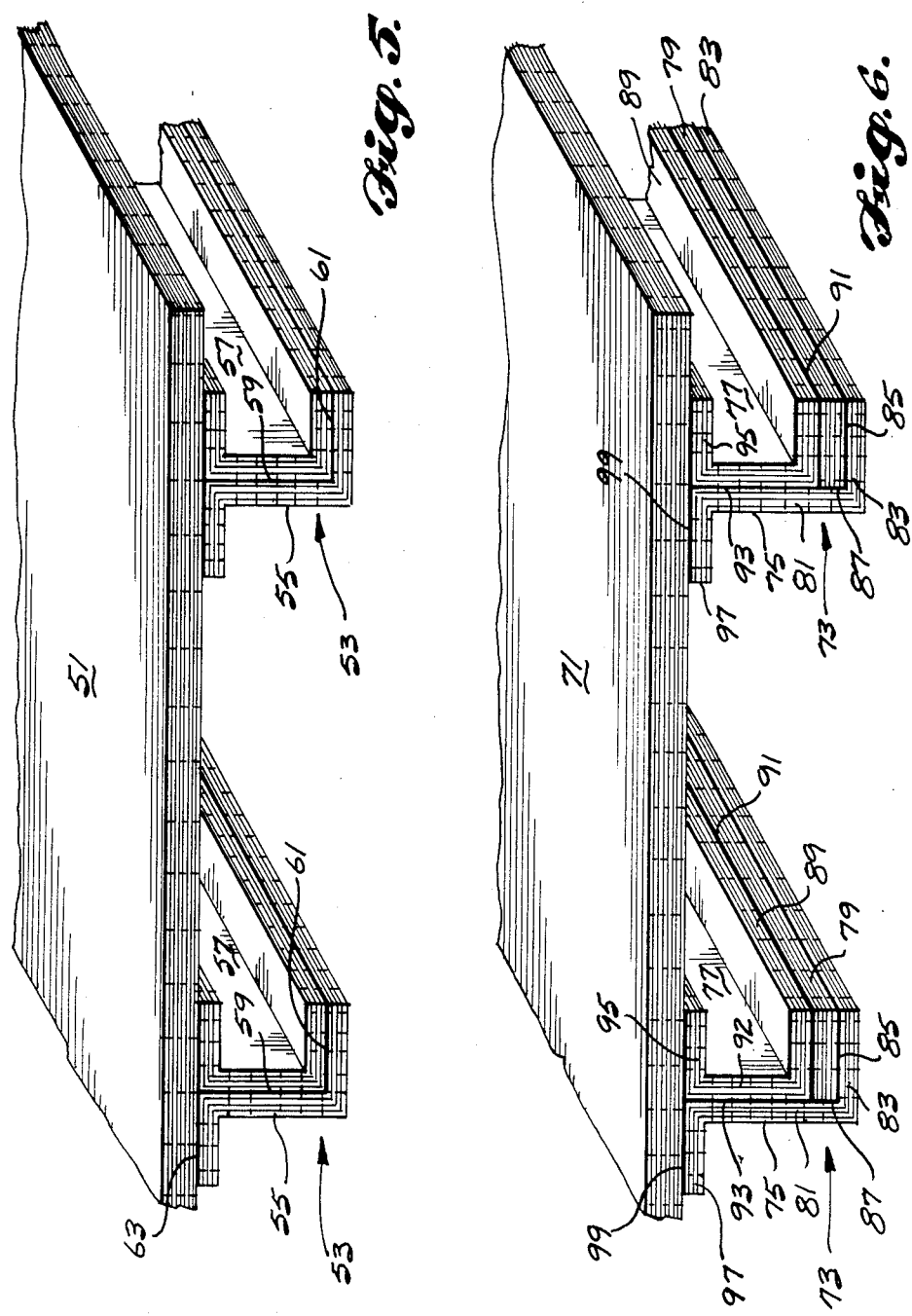

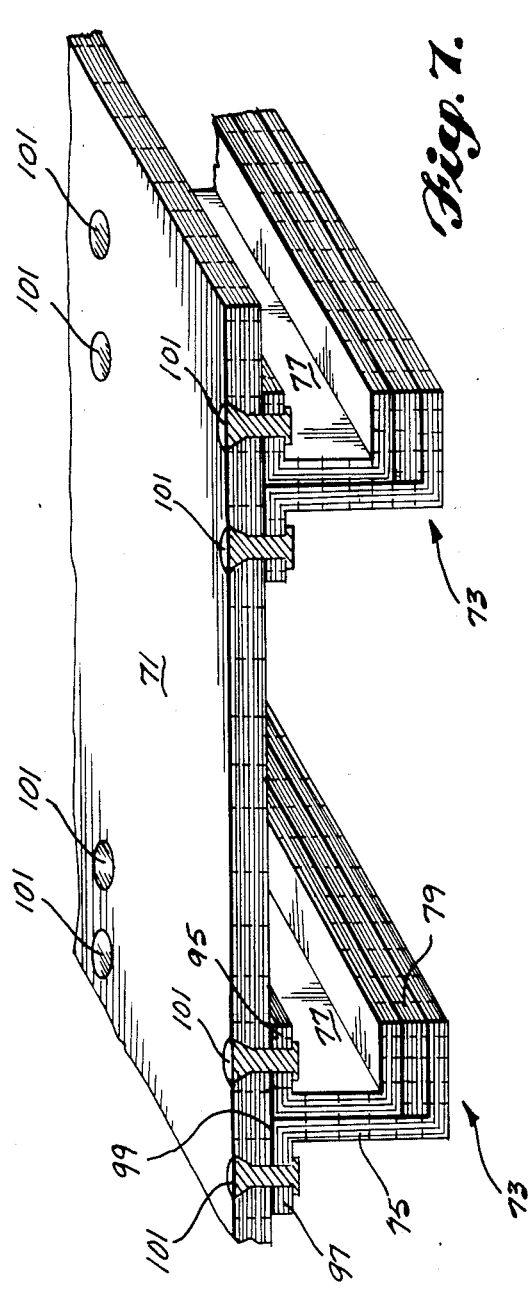
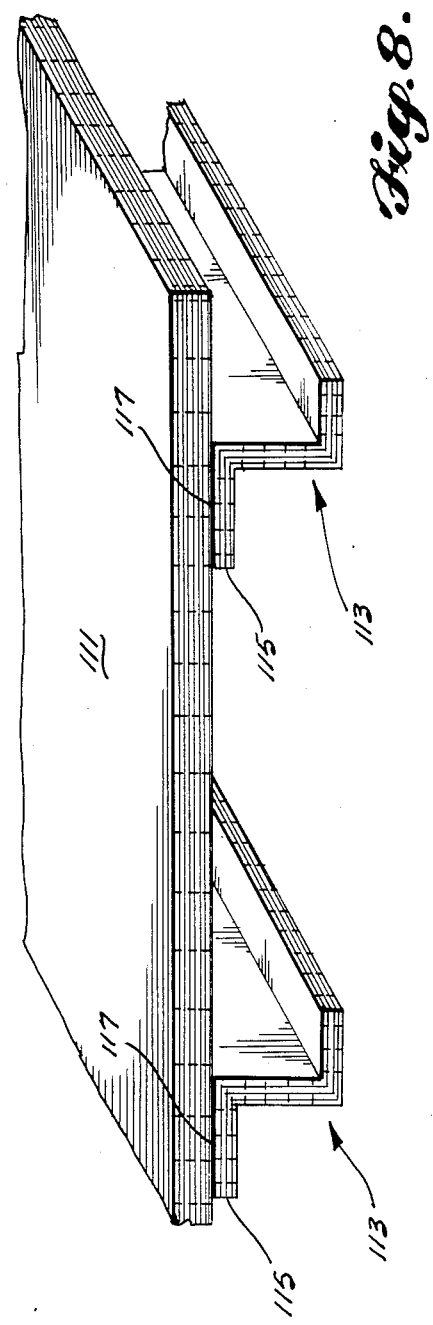

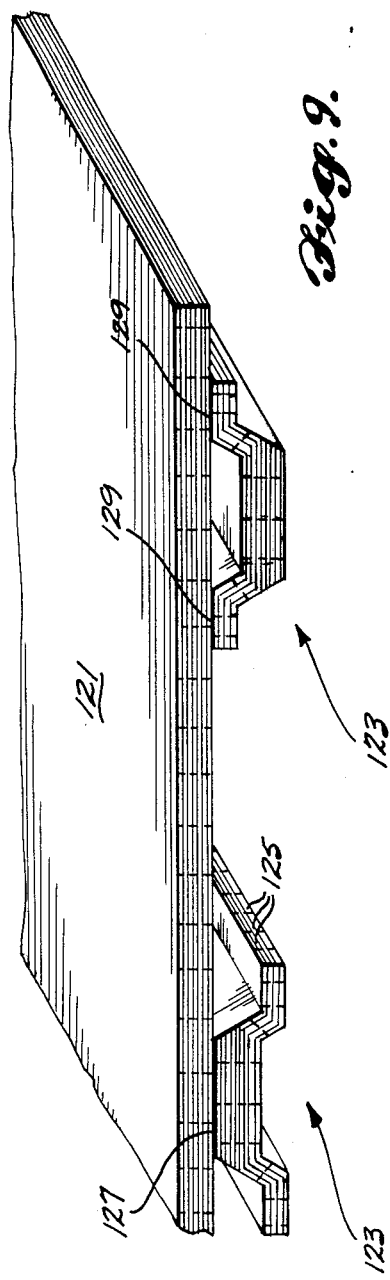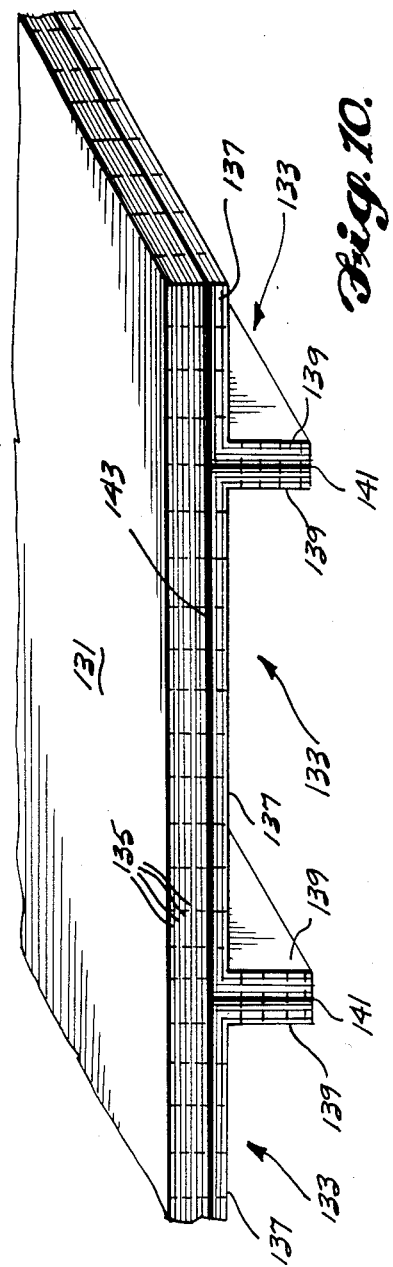

METHOD OF MAKING DELAMINATION RESISTANT COMPOSITES

TECHNICAL AREA

This invention relates to fiber reinforced resin composites and, more particulary, delamination resistant fiber reinforced resin composites.

BACKGROUND OF THE INVENTION

In recent years the use of high strength-to-weight ratio fiber reinforced resin composites has continuously expanded, particulary in weight sensitive products, such as aircraft and space vehicles. Fiber reinforced resin composites are usually formed by "laying-up" a plurality of plies formed of reinforcing fibers. The plies may be preimpregnated with resin; or, resin layers may be added to stacks of dry plies as the lay-up is being formed. In any event, after a lay-up is formed, the resin is cured by applying heat and, usually, pressure to the lay-up. When dry plies and resin layers form the lay-up, the resin is infused into the dry plies as it is cured. In the past, a wide variety of fiber reinforced resin composite components, such as panels, reinforcing members and combinations thereof, have been formed in this manner.

As the use of fiber reinforced resin composites has expanded, the desire to maintain weight at a minimum commensurate with structural integrity has increased the complexity of the resulting structures. In the past, complex structures have been either laid up and cured as a single item or separately formed and joined by mechanical fasteners, such as rivets. Both of these approaches have disadvantages. Complex structures have the disadvantage that they are difficult to layup. Using mechanical fasteners to join previously created fiber reinforced resin composite reinforcing members and panels has the disadvantage of creating joints that tend to weaken as vibration causes wear about the periphery of the holes in which the fasteners are mounted.

As the complexity of fiber reinforced resin composites has increased other problems have also developed. These problems are primarily a result of the ply by ply nature of resin composites, which makes them susceptible to delaminate along interlaminar planes. The tendency to delaminate is, of course, a result of the fact that most composites do not have fibers in the through thickness direction (i.e., the direction orthogonal to the planes of the plies that form the composite), whereby all resistance to delamination along interlaminar planes is a function of the properties of the resin, which usually has a strength 50 to 100 times less than the ply fibers, or a comparable substitute metal.

Several attempts have been made to solve the delamination problem noted above. One attempt involves modification of the chemistry of the resins used in fiber reinforced resin composites to increase resin fracture toughness while maintaining composite compression strength. Most methods of increasing the fracture toughness of a brittle resin, such as an epoxy, involve the addition of at least one component with a lower shear modulus than the resin base. The disadvantage of this approach is that this addition results in a drop of the overall shear modulus. In environments where this approach has been tried, namely in connection with the manufacture of components for aircraft and space vehicles, the shear modulus has dropped below that required to maintain composite compression performance. This approach also has the disadvantage of increasing the susceptibility of the resultant fiber reinforced resin composite to heat and solvents.

A further approach to solving the tendency of fiber reinforced resin composites to delaminate has been to add more mass to keep stresses below the maximum dictated by a low delamination resistance. This approach has the disadvantage of substantially reducing the weight saving advantages of fiber reinforced resin composites.

Another approach used to solve the delamination problem is to design discrete portions of a composite to have a substantially higher stiffness than the remainder of the composite. The stiffener portions become the primary load carrying paths and can be varied to meet structural requirements. The disadvantage of this approach is that it places severe restrictions on design. Further, weight is increased by the material added to discretize the stiffness of various load paths. The end result is a structure that is heavier and more difficult to manufacture than comparable structures that do not have these design constraints.

Finally, the delamination resistance of fiber reinforced resin composites along interlaminar planes has been improved by cross-ply stitching laminate plies together. While this approach does not substantially increase the weight of the resultant reinforced resin composite, it is difficult to satisfactorily implement in fiber resin reinforced composites having complicated cross-sectional configurations.

The present invention is directed to delamination resistant fiber reinforced resin composites that avoid the disadvantages described above.

SUMMARY OF THE INVENTION

In accordance with this invention, fiber reinforced resin composites formed of elements joined by a high shear strength, high fracture toughness adhesive are provided. The elements have any easily produceable cross-sectional shapes such as flat, C-shaped, Z-shaped and T-shaped. When joined the elements form fiber reinforced resin composites having more complicated cross-sectional shapes.

In accordance with further aspects of this invention, the strength of the junctions between elements, such as a panel and reinforcing members are enhanced by mechanical fasteners, such as rivets.

One particular form of the invention comprises pairs of elongate fiber reinforced resin composite elements having C-shaped cross-sectional configurations. The backs of the C-shaped elements are joined by a layer of high shear strength adhesive. The flanges on one side of the resulting I-shaped reinforcing member is attached to a fiber reinforced resin composite panel by another layer of high shear strength adhesive. If desired, the stiffness of the flanges on the other side of the I-shaped reinforcing member can be increased by attaching a fiber reinforced resin composite flat plate to the other flanges by a further layer of high shear strength, fracture tough adhesive. Also if desired, the strength of the junction between the panel supporting flanges of the I-shaped reinforcing members and the panel can be increased by adding mechanical fasteners, such as rivets.

An alternative form of a fiber reinforced resin composite reinforcing member formed in accordance with the invention is created by first longitudinally slicing one edge of an elongate relatively thick, flat fiber reinforced resin composite plate to create two equal thickness segments. The segments are bent outwardly to create a flange, which is attached to a panel to be supported by a layer of high shear strength adhesive. If desired, the edge of the flat plate opposed to the edge forming the flanges can be bent outwardly to stiffen the leg of the thusly formed, generally T-shaped, reinforcing member.

As will be readily appreciated from the foregoing brief summary, the invention provides fiber reinforced resin composites that overcome the disadvantages of prior fiber reinforced resin composites discussed above. Because fiber reinforced resin composites formed in accordance with the invention are created from elements having easily produceable shapes, the plies forming such elements can be readily laid up and cross-ply stitched. Further, because the elements are joined by layers of high shear strength, tough adhesive, the possibility of delamination at the interface between the elements is substantially reduced from what it would be if the elements were merely joined by a low fracture toughness, low shear strength resin of the type used to create the fiber reinforced resin composite elements.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a perspective view of a delamination resistant fiber reinforced resin composite formed in accordance with the invention;

FIG. 2 is a perspective view of the delamination resistant fiber reinforced resin composite illustrated in FIG. 1 with the addition of mechanical fasteners;

FIG. 3 is a perspective view of an alternative embodiment of a delamination resistant fiber reinforced resin composite formed in accordance with the invention;

FIG. 4 is a sequence of views illustrating the formation of the reinforcing member forming part of the delamination resistant fiber reinforced resin composite illustrated in FIG. 3;

FIG. 5 is a perspective view of another embodiment of a delamination resistant fiber reinforced resin composite formed in accordance with the invention;

FIG. 6 is a perspective view of a further embodiment of a delamination resistant fiber reinforced resin composite formed in accordance with the invention:

FIG. 7 is a perspective view of the delamination resistant fiber reinforced resin composite illustrated in FIG. 6 with the addition of mechanical fasteners;

FIG. 8 is a perspective view of yet another embodiment of a delamination resistant fiber reinforced resin composite formed in accordance with the invention;

FIG. 9 is a perspective view of yet still another embodiment of a delamination resistant fiber reinforced resin composite formed in accordance with the invention; and, FIG. 10 is a perspective view of a still further embodiment of a delamination resistant fiber reinforced resin composite formed in accordance with the invention.

DESCRIPTION OF THE PREFERRED EMBODIMENTS

FIG. 1 is a perspective view of a delamination resistant fiber reinforced resin composite formed in accordance with the invention and comprises a panel 11 and a plurality of parallel oriented I-shaped reinforcing members 13. The panel 11 is formed of a plurality of fiber plies 12 laid up in a conventional manner. The plies 12 may originate as prepreg plies (i.e., plies preimpregnated with resin) or dry plies combined with one or more layers or sheets of resin tiles. In any event, the delamination resistance of the plies is enhanced by cross-ply stitches 14.

Each of the I-shaped reinforcing members 13 is formed of two C-shaped elements 15A and 15B and a flat stiffening plate 17. Each of the C-shaped reinforcing elements 15A and 15B is formed of a plurality of laid up plies 19 held together by a suitable resin. As with the panel 11, the plies may originate as prepreg plies or dry plies combined with a layer or layers of resin. In any event, the delamination resistance of the plies is enhanced by cross-ply stitches 20. The flat stiffening plate 17 is also formed by a plurality of laid up plies 21 held together by a suitable resin that has enhanced delamination resistance as a result of cross-ply stitches 22.

The C-shaped elements 15A and 15B are positioned back to back and joined by a first layer of high shear strength, high fracture toughness adhesive 23, which is more fully described below. The result is a reinforcing member having an I-shaped cross sectional configuration. The plate 17 is aligned with the outer face of the flanges located on one side of the I-shaped reinforcing member and is attached thereto by a second layer of high shear strength, high toughness adhesive 25.

The reinforcing members 13 are positioned in parallel on one side of the panel 11 such that the outer faces of the flanges of the I-shaped reinforcing members remote from the flanges attached to the plate 17 face the panel 11. The panel facing flanges of the I-shaped reinforcing members 13 are attached to the panel by third high shear strength, high toughness adhesive layer 27.

The final configuration of the fiber reinforced resin composite illustrated in FIG. 1 can be formed and cured in various ways. If desired, the two C-shaped elements 15A and 15B, the flat stiffening plate 17 and the panel can all be individually laid up and cured in accordance with prior art procedures. The cured elements and the first and second high shear strength, high toughness adhesive layers 23 and 25 can be assembled in the manner described above. After the assemblies are formed, the first and second high shear strength, high toughness adhesive layers 23 and 25 can be cured to create fully cured reinforcing members 13. Thereafter, the reinforcing elements 13 and the panel 11 plus the third high shear strength, high toughness adhesive layer can be assembled in the manner illustrated in FIG. 1 and previously described; and then, the third high shear strength, high toughness adhesive layer 27 cured.

An alternative to the steps just described is to form the elements of the reinforcing members, assemble them with the first and second high shear strength, high toughness adhesive layers 23 and 25 and simultaneously cure the entire assembly, i.e., cure the first and second high shear strength, high toughness layers at the same time the resin matrix that holds the fibers together is cured. A further alternative to assemble the entire structure illustrated in FIG. 1, i.e., all of the elements of the reinforcing members 13 and the panel 11, plus all three high shear strength, high toughness adhesive layers 23, 25 and 27, and cure the entire assembly at the same time.

FIG. 2 illustrates a delamination resistant fiber reinforced resin composite identical to the delamination resistant fiber reinforced resin composite illustrated in FIG. 1 to which a plurality of mechanical fasteners 29 have been added. The mechanical fasteners 29 extend through the panel 11 and juxtaposed flanges of the reinforcing members 13. Thus, the fasteners 29 extend through and enhance the delamination resistance of the fiber reinforced resin composite in the area of the third high shear strength, high toughness adhesive layer 27. While illustrated as solid rivets, it is to be understood that other types of fasteners can be used such as hollow rivets, nuts and bolts, etc., depending upon what is acceptable in a particular environment.

As will be readily appreciated by those familar with composites, normally, the use of fasteners to join fiber reinforced resin composite members together is unacceptable, particulary in high vibration environments, because flexing of the members due to vibration wears away the composite material around the periphery of the holes in which the fasteners are mounted. The inclusion of the third high shear strength, high toughness adhesive layer 27 substantially reduces this undesirable result because the vibration flexing of the members at the junction between the panel 11 and the reinforcing members 13 is substantially reduced by the third high shear strength, high toughness adhesive layer. Further, flow of the adhesive around the fasteners 29 provides a bond between the fasteners and the members joined by the fasteners if the adhesive is cured after the holes have been drilled and the fasteners inserted. Maximum join strength is attained by applying pull up torque to a threaded fastener, if used, or heading a rivet, if used, after the adhesive has been cured.

FIG. 3 illustrates a delamination resistant fiber reinforced resin composite formed in accordance with the invention that comprises a panel 31 stiffened and supported by a plurality of elongate, generally t-shaped, reinforcing members 33. Both the panel 31 and the reinforcing members are formed of a plurality of laid-up plies. The delamination resistance of the ply lay-ups is enhanced by cross-ply stitching. Also, preferably, the generally t-shaped reinforcing members 33 are formed in the manner illustrated in FIG. 4 and described below. The generally t-shaped reinforcing members 33 lie along parallel axes and are attached to the panel 31 via their flanges by a high shear strength, high fracture toughness adhesive layer 39. As before, the high shear strength, high fracture toughness adhesive layer can be cured at the same time the resin that binds the plies together is cured or the reinforcing members 33 and the panel 31 can be created separately and their resins cured prior to being joined by the high shear strength, high touchness adhesive layer 39.

FIG. 4 is a sequence of views illustrating the preferred way of forming the generally t-shaped reinforcing members illustrated in FIG. 3. First, a stack of plies 41 are laid up. Since the reinforcing members are elongate, in essence, the result is an elongate stack of plies. A slit 43 is then made along one edge of the stack of plies 41. Preferably, the number of plies lying on either side of the slit is identical. The thusly separated plies are then bent outwardly to form a pair of flanges 45 that lie orthogonal to the remainder of the structure. At this point, the structure has a cross-sectional shape of a T. Next, the edge of the stack of plies 41 remote from the flanges 45 (i.e., the leg of the T) is bent to form a protrusion 47 that lies parallel to one of the flanges 45. After being thusly formed, the resin of the now generally t-shaped support member is cured either prior to attachment to the panel 31 (FIG. 3) by the high shear strength, high toughness adhesive layer 39 or after attachment, as previously described.

FIG. 5 is a perspective view of a further embodiment of a fiber reinforced resin composite formed in accordance with the invention comprising a panel 51 reinforced and supported by a plurality of elongate, parallel oriented reinforcing members 53. While the reinforcing members 53 have the same cross-sectional configuration as the generally t-shaped reinforcing members 33 illustrated in FIG. 3, they are formed in a different manner. Specifically, the reinforcing members 53 illustrated in FIG. 5 are each formed of two elements—a Z-shaped element 55 and a C-shaped element 57. As with the previously described embodiments of the invention, the Z-shaped elements 55 and the C-shaped elements 57 are formed by laying up a plurality of plies joined by a resin matrix. The plies may be prepreg plies or dry plies to which one or more layers of resin are added, the resin being infused into the dry plies during curing as described in U.S. patent application Ser. No. 676,427, filed Nov. 29, 1984, by Leslie E. Letterman and entitled "Resin Film Infusion Process and Apparatus". As illustrated, the plies of both the panel 51 and the reinforcing members 53 are cross-ply stitched to improve delamination resistance.

The reinforcing members are created by positioning the C-shaped elements 57 such that the back of a C-shaped element faces one side of the center leg of a Z-shaped element 55 and the outer surface of one of the legs of the C-shaped element 57 faces the inner surface of one of the legs of the Z-shaped element 55. Located between facing surfaces of the Z-shaped element 55 and the C-shaped element 57 are first and second high shear strength, high fracture toughness adhesive layers 59 and 61. A third high shear strength, high toughness adhesive layer 63 is located between the panel 51 and the flanges of the thusly formed generally t-shaped reinforcing member 53. As before, the Z-shaped and C-shaped elements 55 and 57 that form the reinforcing members 53 can be separately formed and cured or the elements can be joined by the first and second high shear strength, high toughness adhesive layers 59 and 61 before the C-shaped and Z-shaped elements are cured; or the entire fiber reinforced resin composite structure illustrated in FIG. 5 can be assembled prior to resin and adhesive curing.

FIG. 6 illustrates a fiber reinforced resin composite formed in accordance with the invention that comprises a panel 71 supported and reinforced by a plurality of elongate, generally t-shaped reinforcing members 73. The difference between the fiber reinforced resin composite illustrated in FIG. 6 and the fiber reinforced resin composite illustrated in FIGS. 3 and 5 resides in the way the generally t-shaped reinforcing members are formed. Rather than being formed of a single element or two elements, i.e., a Z-shaped element and a C-shaped element, the generally t-shaped reinforcing members 73 illustrated in FIG. 6 are each formed of three elements—a Z-shaped element 75; a C-shaped 77; and, a flat plate 79.

The flat plate 79 is positioned in the corner created by the center leg 81 and one of the outer legs 83 of the Z-shaped element 75. A first layer of high shear strength, high toughness adhesive 85 is positioned between the facing surfaces of the flat plate 79 and the outer leg 83 of the Z-shaped element 75. A second layer of high shear strength, high toughness adhesive 87 is located between the edge of the flat plate 79 and the facing area of the center leg 81 of the Z-shaped element 75. The C-shaped element 77 is positioned in the corner created by the other surface of the flat plate 79 and the center leg 81 of the Z-shaped element 75. The orientation of the C-shaped element is such that the outer surface of one leg 89 of the C-shaped element faces the other surface of the plate 79 and is attached thereto by a third layer of high shear strength, high toughness adhesive 91. The back of the C-shaped element 77 faces the center leg 81 of the Z-shaped element 55 and is attached thereto by a fourth layer of high shear strength, high toughness adhesive 93. The C-shaped element 77 is sized such that the outer surface of its other leg 95 is co-planar with the outer surface of the other outer leg 97 of the Z-shaped element 75. The outer surface of the outer leg 95 of the C-shaped element 77 and the other outer leg 97 of the Z-shaped element 75 are attached to the panel 71 by a fifth layer of high shear strength, high toughness adhesive 99.

As with the previously described embodiments of the invention, the individual elements that form the fiber reinforced resin composite illustrated in FIG. 6 can be formed and cured separately prior to being joined together. Or some of the elements, such as all of the elements that form the elongate, generally t-shaped reinforcing members 73, can be cured after being joined. Or, still further, all of the elements, including the panel 71, can be joined and the resin and adhesive layers of the entire three dimensional fiber reinforced resin composite simultaneously cured. In addition, the various high shear strength, high toughness layers 85, 87, 91, 93 and 99 can be butt spliced where they meet, i.e., it is not necessary that the second and third layers overlap, for example.

FIG. 7 illustrates a three dimensional fiber reinforced resin composite formed in accordance with the invention identical to the three dimensional fiber reinforced resin composite illustrated in FIG. 6 and previously described to which a plurality of mechanical fasteners 101 have been added. The mechanical fasteners lie in holes that extend through the panel 71 and the juxtaposed flanges 95 and 97 of the elongate, generally t-shaped support members 73. While the mechanical fasteners 101 are illustrated as rivets, it is to be understood that other types of fasteners can be utilized, if desired.

FIG. 8 illustrates a three dimensional fiber reinforced resin composite formed in accordance with the invention that comprises a panel 111 supported and stiffened by a plurality of elongate, parallel oriented Z-shaped reinforcing members 113. As with the previously described embodiments of the invention, the panel and the Z-shaped reinforcing members 113 are each formed of a plurality of fiber reinforcing plies held together by a resin matrix. The plies can be cross-ply stitched as illustrated by the dashed lines. Rather than being formed of a plurality of elements joined by high shear strength, high fracture toughness adhesive layers, the Z-shaped reinforcing members 113 of the fiber reinforced resin composite illustrated in FIG. 8 are a single element. One of the legs 115 of each Z-shaped reinforcing member 113 underlies the panel 111 and is joined thereto by a layer of high shear strength, high toughness adhesive 117. As with the previously described embodiments of the invention, the panel 111 and the Z-shaped reinforcing members 113 can be formed and cured as separate items prior to being joined together by the high shear strength, high toughness adhesive layers 117. Alternatively, the panel 111 and the Z-shaped reinforcing member 113 resins can be cured simultaneously with the curing of the high shear strength, high toughness adhesive layers 117.

FIG. 9 illustrates a further alternative embodiment of a fiber reinforced resin composite formed in accordance with the invention. The embodiment of the invention illustrated in FIG. 9 includes a panel 121 supported and stiffened by a plurality of parallel oriented, elongate hat-shaped reinforcing members 123. The hat-shaped reinforcing members 123 are formed from a plurality of laid up fiber reinforcing plies held together by a resin matrix. As in the previously described embodiments of the invention, preferably, the plies are stitched in a cross-ply direction to increase delamination resistance. As illustrated in FIG. 9, depending upon design and other criteria, either the cross member of the hat-shaped reinforcing elements 123 can be attached to the panel 121 by a single layer of high shear strength, high toughness adhesive 127 or the flanges can be attached by two layers of high shear strength, high toughness adhesive 129. Obviously, if desired, the same region of all hat-shaped reinforcing elements can be attached to the panel 121 in the same way, rather than some being attached one way and others being attached the other way, as illustrated in FIG. 9.

As with the previously described embodiments of the invention, the panel 121 and the hat-shaped reinforcing members 123 illustrated in FIG. 9 can be separately formed and cured prior to being joined, or they can be joined and their resins cured simultaneously with the curing of the high shear strength, high toughness adhesive layers. In addition, fasteners can be applied at the junction between the hat-shaped reinforcing members 123 and the panel 121.

FIG. 10 is a perspective view of yet still another three dimensional fiber reinforced resin composite formed in accordance with the invention. The fiber reinforced resin composite illustrated in FIG. 10 comprises a panel 131 supported by a plurality of elongate, wide U-shaped reinforcing members 133. As with the previously described embodiments of the invention, the panel 131 is formed of a stack of plies 135 held together by a resin matrix. The plies can be stitched together in the cross-ply direction to improve delamination resistance. The wide U-shaped reinforcing members 133 include a wide cross leg 137 facing one side of the panel 131. The U-shaped support members are also formed of a plurality of plies 145 held together by a resin matrix. The delamination resistance of the U-shaped reinforcing members 137 can be enhanced by cross-ply stitching. The wide U-shaped reinforcing members 133 are sized such that the legs of adjacent U-shaped support and reinforcement members can be attached together by a first layer of high shear strength, high fracture toughness adhesive 141. A second layer of high shear strength, high toughness adhesive 143 attaches the cross legs 137 of the wide U-shaped support reinforcing members 133 to the juxtaposed face of the panel 131.

As with the previously described embodiments of the invention, the wide U-shaped reinforcing members 133 and the panel 131 can be separately formed and cured prior to being joined by the first and second high shear strength, high toughness adhesive layers 141 and 143. Alternatively, the panel 131 and the wide U-shaped reinforcing members 133 can be laid up and joined by the high shear strength, high toughness adhesive layers prior to their resin being cured. In the latter case, the high shear strength, high fracture toughness adhesive layers 141 and 143 are cured simultaneously with the curing of the panel 131 and the wide U-shaped support and reinforcing member resins.

As will be readily appreciated from the foregoing description, the invention comprises three dimensional fiber reinforced resin composites formed of elements joined by high shear strength, high fracture toughness adhesive layers. The elements are in easily reproduceable configurations, such as flat, C-shaped, Z-shaped or T-shaped, as opposed to being in more complex configurations. In accordance with the invention, the elements can be joined to form complex reinforcing member configurations and combined with panels to create relatively complicated fiber reinforced resin composites. Because the elements are joined by high shear strength, high toughness adhesive layers, fiber reinforced resin composites formed in accordance with the invention have a higher resistance to delamination than they would have if the elements were joined by a resin of the type utilized to hold individual fiber plies together.

As will be readily appreciated from the foregoing description, the high shear strength, high fracture toughness adhesive used to form embodiments of the invention is not the same as the resin infused into the fiber plies of the various elements and members to bind the plies together. Rather the adhesive has considerably higher shear strength, which is what makes it more split resistant. One adhesive that is ideally suited for use in creating embodiments of the invention for use in aircraft is the FM300 thermosetting adhesive film available from American Cynamid Company, Bloomingdale Department, Harve de Grace, Md. 21078. The double lap shear strength of this adhesive is approximately 3000 PSI at room temperature. Its room temperature (75°±5° F.) honeycomb flatwise tensile strength and its sandwich beam shear strength are both better than 500 PSI. Other thermosetting adhesives suitable for use in this invention are the AF147 adhesive manufactured by the 3M Company, 3M Center, St. Paul, Minn. and the R398 adhesive manufactured by Ciba Giegy Corporation, Ardsley, N.Y. Because the high shear strength, high fracture toughness adhesive does not serve as an elastic foundation support for the fibers of the composite, it is not necessary that the adhesive have matrix reinforcing properties. Thus, any adhesive having peel and sheer strengths comparable to FM 300, AF147 or R398 may be employed. The chosen adhesive must, of course, be compatible with the base resin in terms of service temperature, require life, etc. as well as have the properties discussed above.

While preferred embodiments of the invention have been illustrated and described, it will be appreciated that various changes can be made therein without departing from the spirit and scope of the invention. Consequently, the invention can be practiced otherwise than as specifically described herein.

The embodiments of the invention in which an exclusive property or privilege is claimed are defined as follows:

1. A method of making a delamination resistant fiber reinforced resin composite comprising the steps of:

forming a fiber reinforced resin composite panel from a plurality of plies and a resin matrix;

forming a fiber reinforced resin composite reinforcing member from a plurality of plies and a resin matrix; and, bonding said fiber reinforced resin composite panel to said fiber reinforced resin composite reinforcing member with a high shear strength, high toughness, thermosetting resin adhesive layer, said thermosetting resin being different from the resin used to form said resin matrix of said fiber reinforced resin composite panel and said fiber reinforced resin composite reinforcing member.

2. The method claimed in claim 1, wherein the resin used to form said fiber reinforced resin composite panel is cured prior to said fiber reinforced resin composite panel being bonded to said fiber reinforced resin composite reinforcing element by said high shear strength, high toughness, thermosetting resin adhesive layer.

3. The method claimed in claim 2, wherein the resin used to form said fiber reinforced resin composite reinforcing member is cured prior to said panel being bonded to said fiber reinforced resin composite reinforcing member by said high shear strength, high toughness, thermosetting resin adhesive layer.

4. The method claimed in claim 1, wherein the resin used to form said fiber reinforced resin composite reinforcing member is cured prior to said panel being bonded to said fiber reinforced resin composite reinforcing member by said high shear strength, high toughness, thermosetting resin adhesive layer.

5. The method claimed in claim 1, wherein the resin used to form said fiber reinforced resin composite panel, the resin used to form said fiber reinforced resin composite reinforcing member and said high shear strength, high toughness, thermosetting resin adhesive layer are all cured simultaneously.

6. The method claimed in claim 1, including the step of crossply stitching the plies of said fiber reinforced resin composite panel to enhance the delamination resistance of said fiber reinforced resin composite panel.

7. The method claimed in claim 6, wherein the resin used to form said fiber reinforced resin composite panel is cured prior to said fiber reinforced resin composite panel being bonded to said fiber reinforced resin composite reinforcing element by said high shear strength, high toughness, thermosetting resin adhesive layer.

8. The method claimed in claim 7, wherein the resin used to form said fiber reinforced resin composite reinforcing member is cured prior to said panel being bonded to said fiber reinforced resin composite reinforcing member by said high shear strength, high toughness, thermosetting resin adhesive layer.

9. The method claimed in claim 6, wherein the resin used to form said fiber reinforced resin composite reinforcing member is cured prior to said panel being bonded to said fiber reinforced resin composite reinforcing member by said high shear strength, high toughness, thermosetting resin adhesive layer.

10. The method claimed in claim 6, wherein the resin used to form said fiber reinforced resin composite panel, the resin used to form said fiber reinforced resin composite reinforcing member and said high shear strength, high toughness, thermosetting resin adhesive layer are all cured simultaneously.

11. The method claimed in claim 6, including the step of crossply stitching the plies of said fiber reinforced resin composite reinforcing member in order to enhance the delamination resistance of said fiber reinforced resin composite reinforcing member.

12. The method claimed in claim 11, wherein the resin used to form said fiber reinforced resin composite panel is cured prior to said fiber reinforced resin composite panel being bonded to said fiber reinforced resin composite reinforcing element by said high shear strength, high toughness, thermosetting resin adhesive layer.

13. The method claimed in claim 12, wherein the resin used to form said fiber reinforced resin composite reinforcing member is cured prior to said panel being bonded to said fiber reinforced resin composite reinforcing member by said high shear strength, high toughness, thermosetting resin adhesive layer.

14. The method claimed in claim 11, wherein the resin used to form said fiber reinforced resin composite reinforcing member is cured prior to said panel being bonded to said fiber reinforced resin composite reinforcing member by said high shear strength, high toughness, thermosetting resin adhesive layer.

15. The method claimed in claim 11, wherein the resin used to form said fiber reinforced resin composite panel, the resin used to form said fiber reinforced resin composite reinforcing member and said high shear strength, high toughness, thermosetting resin adhesive layer are all cured simultaneously.

16. The method claimed in claim 1, wherein said fiber reinforced resin composite reinforcing member is formed of at least two elements, said two elements being juxtaposed along at least one surface and including a further high shear strength, high toughness, thermosetting resin adhesive layer located between said juxtaposed surfaces for attaching said juxtaposed surfaces together.

17. The method claimed in claim 16, wherein the resin used to form said fiber reinforced resin composite panel is cured prior to said fiber reinforced resin composite panel being bonded to said fiber reinforced resin composite reinforcing element by said high shear strength, high toughness, thermosetting resin adhesive layer.

18. The method claimed in claim 17, wherein the resins used to form said at least two elements used to form said fiber reinforced resin composite reinforcing member are cured prior to said elements being bonded together and to said panel by said high shear strength, high toughness, thermosetting resin adhesive layers.

19. The method claimed in claim 16, wherein the resins used to form said at least two elements used to form said fiber reinforced resin composite reinforcing member are cured prior to said elements being bonded together and to said panel by said high shear strength, high toughness, thermosetting resin adhesive layers.

20. The method claimed in claim 16, wherein the resin used to form said fiber reinforced resin composite panel, the resin used to form said at least two elements used to form said fiber reinforced resin composite reinforcing member and said high shear strength, high toughness, thermosetting resin adhesive layers are all cured simultaneously.

21. The method claimed in claim 16, including the step of cross-ply stitching the plies of said fiber reinforced resin composite panel to enhance the delamination resistance of said fiber reinforced resin composite panel.

22. The method claimed in claim 21, wherein the resin used to form said fiber reinforced resin composite panel is cured prior to said fiber reinforced resin composite panel being bonded to said fiber reinforced resin composite reinforcing element by said high shear strength, high toughness, thermosetting resin adhesive layer.

23. The method claimed in claim 22, wherein the resins used to form said at least two elements used to form said fiber reinforced resin composite reinforcing member are cured prior to said elements being bonded together and to said panel by said high shear strength, high toughness, thermosetting resin adhesive layers.

24. The method claimed in claim 21, wherein the resins used to form said at least two elements used to form said fiber reinforced resin composite reinforcing member are cured prior to said elements being bonded together and to said panel by said high shear strength, high toughness, thermosetting resin adhesive layers.

25. The method claimed in claim 21, wherein the resin used to form said fiber reinforced resin composite panel, the resin used to form said at least two elements used to form said fiber reinforced resin composite reinforcing member and said high shear strength, high toughness, thermosetting resin adhesive layers are all cured simultaneously.

26. The method claimed in claim 21, including the step of cross-ply stitching the plies of said at least two elements used to form said fiber reinforced resin composite reinforcing member in order to enhance the delamination resistance of said elements.

27. The method claimed in claim 26, wherein the resin used to form said fiber reinforced resin composite panel is cured prior to said fiber reinforced resin composite panel being bonded to said fiber reinforced resin composite reinforcing element by said high shear strength, high toughness, thermosetting resin adhesive layer.

28. The method claimed in claim 27, wherein the resins used to form said at least two elements used to form said fiber reinforced resin composite reinforcing member are cured prior to said elements being bonded together and to said panel by said high shear strength, high toughness, thermosetting resin adhesive layers.

29. The method claimed in claim 26, wherein the resins used to form said at least two elements used to form said fiber reinforced resin composite reinforcing member are cured prior to said elements being bonded together and to said panel by said high shear strength, high toughness, thermosetting resin adhesive layers.

30. The method claimed in claim 26, wherein the resin used to form said fiber reinforced resin composite panel, the resin used to form said at least two elements used to form said fiber reinforced resin composite reinforcing member and said high shear strength, high toughness, thermosetting resin adhesive layers are all cured simultaneously.

* * * * *